United States Patent
Jetter

(10) Patent No.: US 6,505,899 B1
(45) Date of Patent: Jan. 14, 2003

(54) CENTER RELEASE DRIVE SLED

(75) Inventor: Robert S. Jetter, Fremont, CA (US)

(73) Assignee: Acorn Product Development, Inc., Fremont, CA (US)

( * ) Notice: Subject to any disclaimer, the term of this patent is extended or adjusted under 35 U.S.C. 154(b) by 0 days.

(21) Appl. No.: 09/861,805

(22) Filed: May 21, 2001

(51) Int. Cl.[7] ............................................. A47B 97/00
(52) U.S. Cl. .................. 312/223.1; 312/332.1
(58) Field of Search .................... 312/223.1, 223.2, 312/330.1, 332.1, 333; 361/683, 684, 685, 725, 727; 439/152, 153, 155, 157

(56) References Cited

U.S. PATENT DOCUMENTS

| | | | | |
|---|---|---|---|---|
| 5,269,698 A | * | 12/1993 | Singer | 439/157 |
| 5,325,263 A | * | 6/1994 | Singer et al. | 361/683 |
| 5,588,728 A | * | 12/1996 | Eldridge et al. | 312/223.1 X |
| 5,943,208 A | * | 8/1999 | Kato et al. | 312/223.1 X |
| 6,008,984 A | * | 12/1999 | Cunningham et al. | 312/332.1 X |
| 6,186,804 B1 | * | 2/2001 | Smith et al. | 439/157 |
| 6,270,174 B1 | * | 8/2001 | Nishi | 312/223.1 |
| 6,304,439 B1 | * | 10/2001 | Anderson | 361/685 |

FOREIGN PATENT DOCUMENTS

FR          1354308       *    1/1964    ............... 312/223.1

* cited by examiner

*Primary Examiner*—James O. Hansen
(74) *Attorney, Agent, or Firm*—The Kline Law Firm

(57) ABSTRACT

A computer drive sled with a center mount release mechanism eliminates lateral protrusions on the sled. The sled housing mechanism includes a latching means that secures the sled in position when it is inserted into a modular tray for computer components. A release trigger retracts the latch when the trigger is compressed so that the sled can be removed from the tray. The natural elasticity of the latching means returns the latching means to the locking position when the applied pressure on the release trigger is removed.

5 Claims, 5 Drawing Sheets

CENTER RELEASE DRIVE SLED

BACKGROUND OF THE INVENTION

1. Field of the Invention

The present invention relates generally to computer component mounting devices, and more particularly is a drive sled with a release mechanism located in the center of the sled.

2. Description of the Prior Art

As a computer system grows larger and more complex, the utilization of floor space becomes an increasingly important concern. Some or all of the system's components may be mounted in rack structures that allow a plurality of components to be mounted side-by-side in modular trays. The modular trays are then stacked vertically in the rack. Minimizing the space requirements for mounting the components becomes a quite important concern as the number of components used in the system grows. Since the height of the modular trays is determined by industry standards, the only variable factor relative to space consumption is the width of the component sleds mounted in the trays.

In a typical application using current art devices, the component is contained in a drive sled with a side mount latch. The side mount latch drive sled is the most commonly used construction in the industry. Because of the size and conformation of the component sleds, three is the maximum number of components that will fit side-by-side in the modular tray using the side mount latch drive sleds.

Accordingly, it is an object of the present invention to provide a drive sled that uses less space than the current art devices so that four components can be positioned side-by-side within a single modular tray.

It is a further object of the present invention to provide a drive sled with a center mount latch and release.

It is a still further object of the present invention to provide a center mount release mechanism that serves as a convenient means of carrying the drive sled.

SUMMARY OF THE INVENTION

The present invention is a computer drive sled with a center mount release mechanism. The center mount release eliminates the need for any lateral protrusions on the sled. The sled housing mechanism comprises a latching means that secures the sled in position when it is inserted into a modular tray for computer components. A release trigger retracts the latch when the trigger is compressed so that the sled can be removed from the tray. The natural elasticity of the latching means returns the latching means to the locking position when the applied pressure on the release trigger is removed.

A chief advantage of the present invention is that it reduces the lateral space requirement for a component drive. As illustrated in FIG. 1, the lateral space typically required for the latching mechanism 3 of a prior art drive sled 5 is eliminated with the center release drive sled 10 of the present invention. The space savings gained is quite significant, as it allows four drives to be mounted side-by-side as opposed to the standard three.

Another advantage of the present invention is that the trigger of the latching mechanism serves as a convenient carrying handle.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
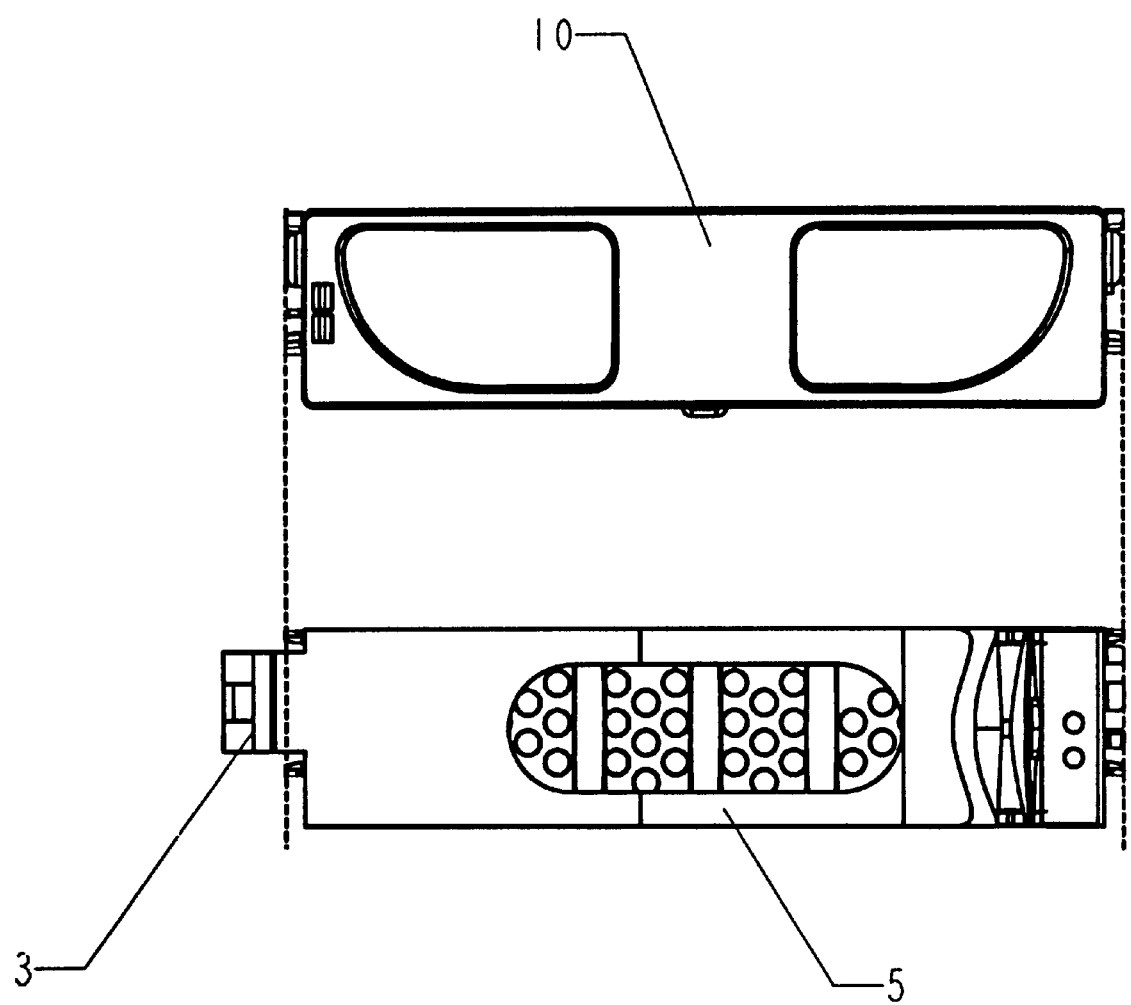
FIG. 1 is a front view comparing the drive sled of the present invention and a side mount latch drive sled of the prior art.
Figure 2:
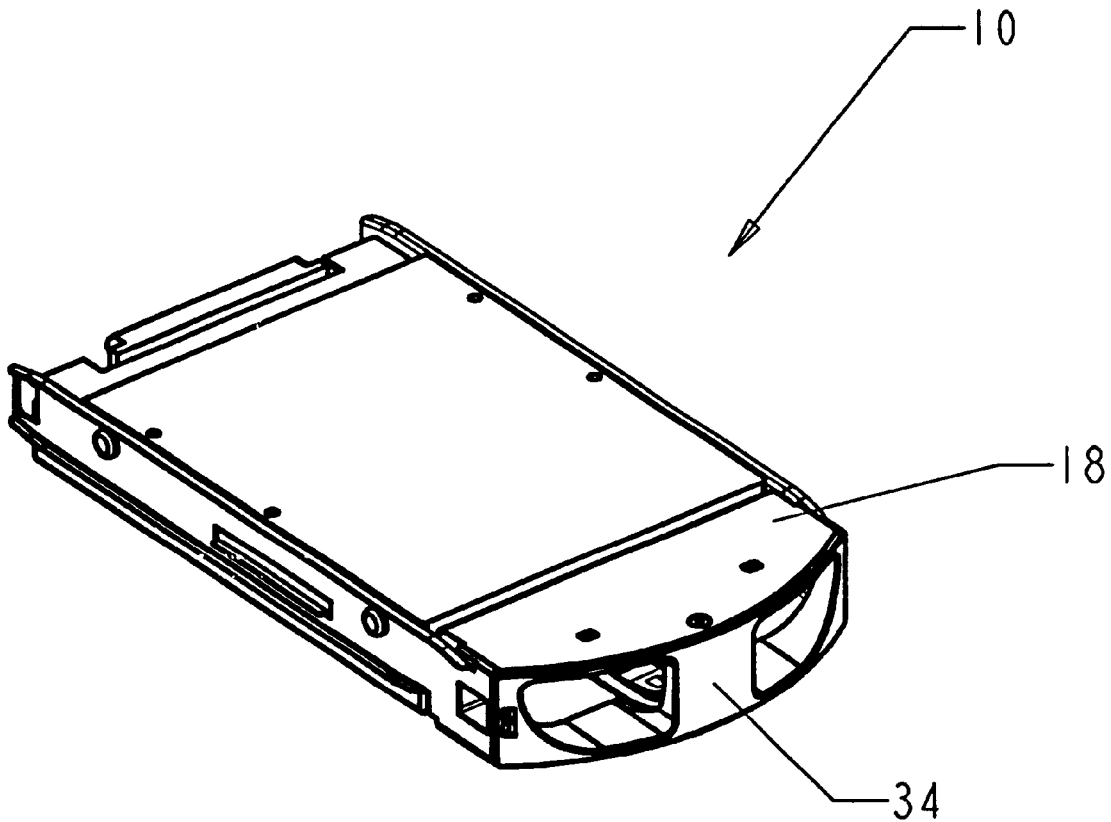
FIG. 2 is a perspective view of the center release drive sled of the present invention.
Figure 4:
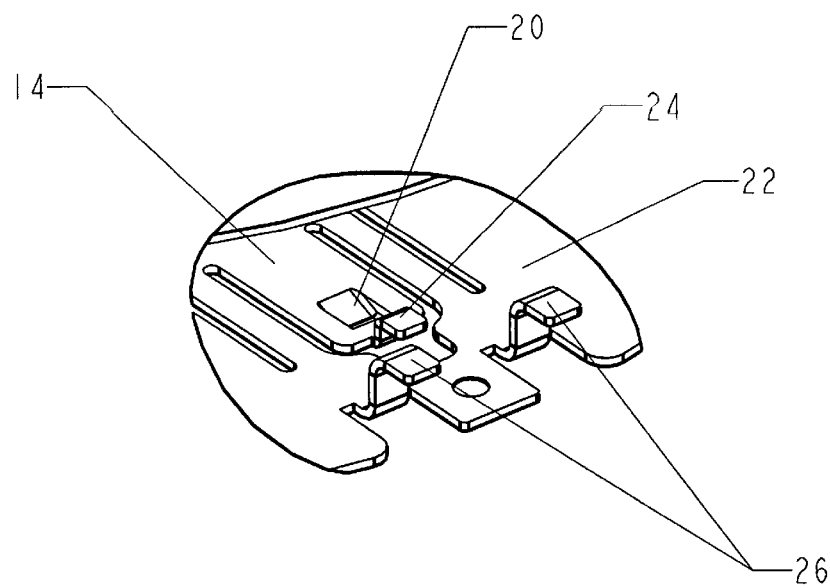
FIG. 4 is an exploded view with the hard drive removed.

The present invention is a computer drive sled 10 with a center mount release mechanism. The release mechanism comprises a latching means 14 that secures the drive sled 10 in position when the drive sled 10 is inserted into a modular tray for computer components. A release trigger 16 mounted in the frame 18 of the sled 10 retracts a securing component of the latching means 14 when the trigger 16 is compressed so that the drive sled 10 can be removed from the tray. The inherent elasticity of the latching means 14 returns the latching means 14 to the locking position when the applied pressure on the release trigger 16 is removed.

The latching means 14 comprises a downward extending stop protrusion 20 which functions as the securing component. The downward extending stop protrusion 20 is integral to a floor 22 of the drive sled 10. In the preferred embodiment, the stop protrusion 20 is punched out of the floor 22 of the drive sled 10.

The latching means 14 further includes a connecting tab 24 that extends upward from the floor 22 of the drive sled 10. Again, in the preferred embodiment, the connecting tab 24 is punched out (albeit in the opposite direction as compared to the stop protrusion 20) of the floor 22 of the drive sled 10.

Also punched out of the drive sled floor 22 at a front center position are a pair of axle mounts 26. The axle mounts 26 receive ends of a pivot axle 28 of the trigger 16 so that the trigger 16 is pivotally secured in the drive sled 10.

Figure 3:
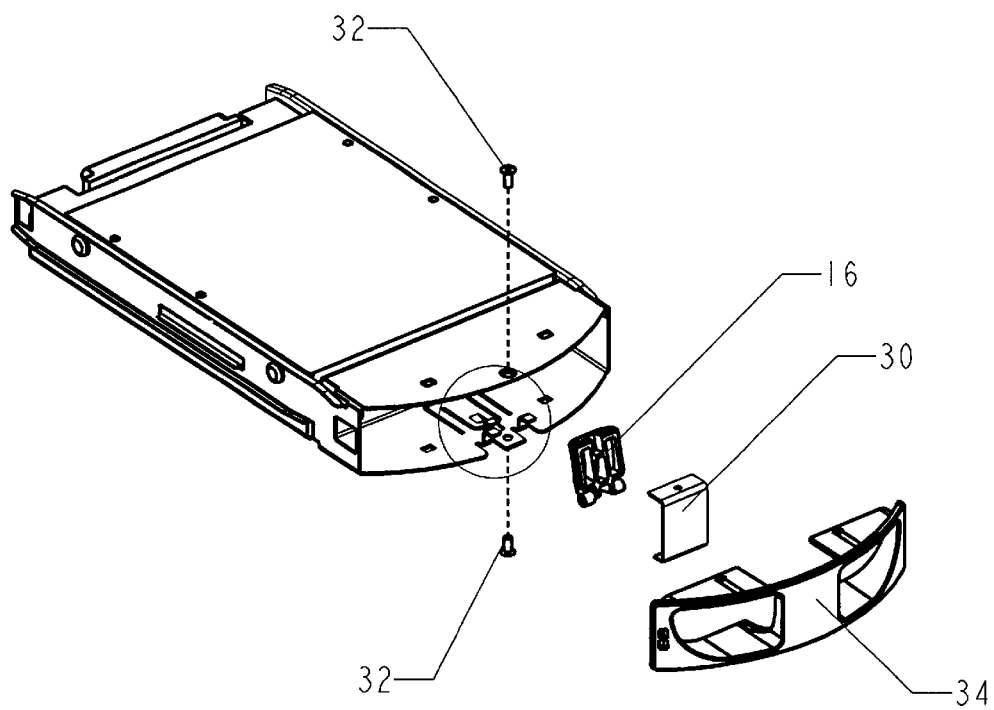
FIG. 3 is an exploded perspective view of the center release drive sled.
Figure 6:
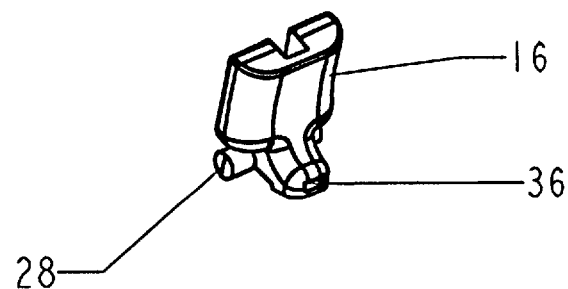
FIG. 6 is a side view of the release mechanism.
Figure 5:
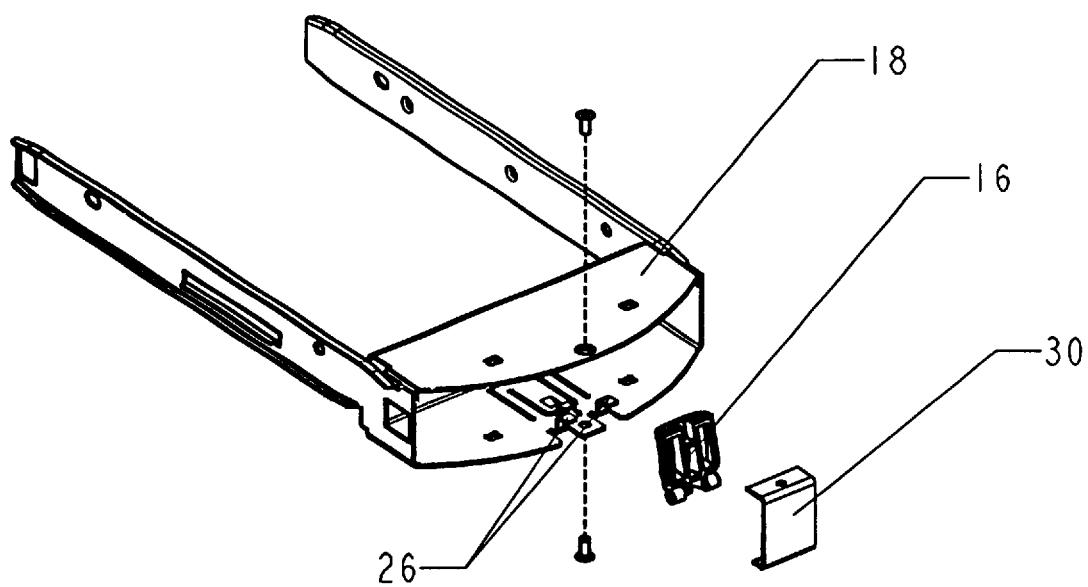
FIG. 5 is a detail view of the release trigger.
Figure 7:
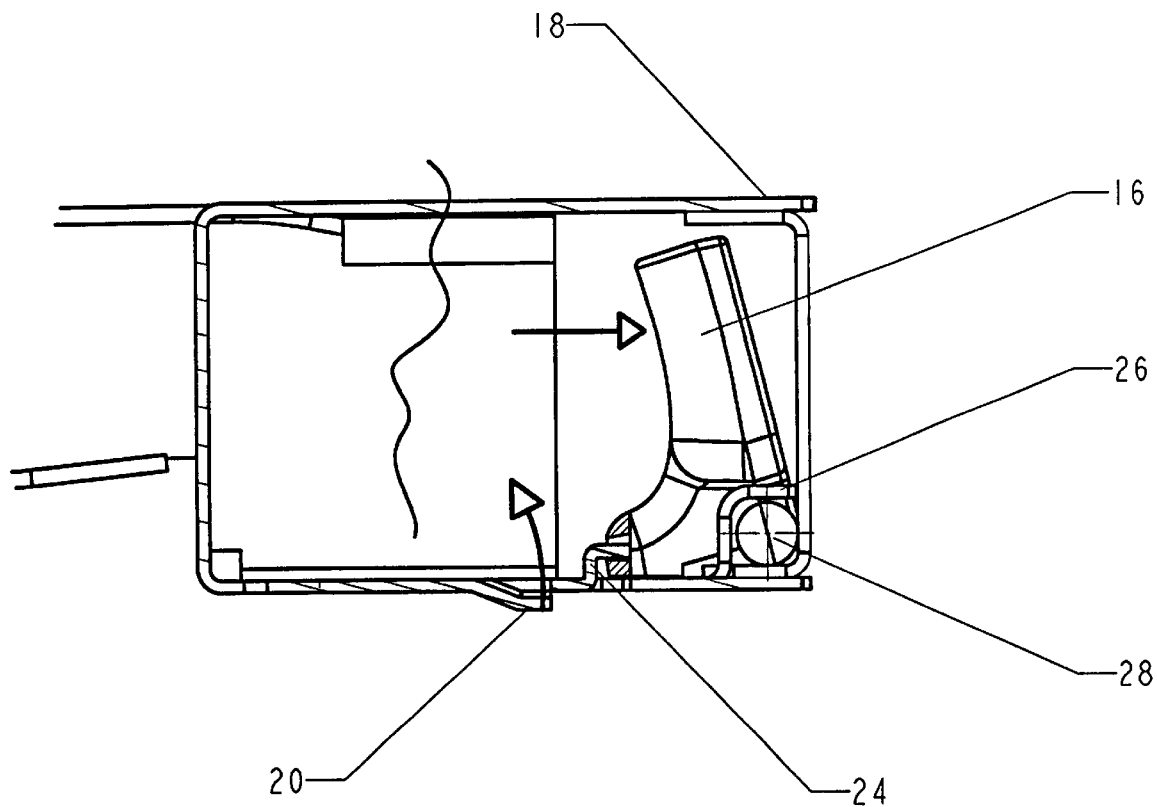
FIG. 7 is a sectional view of the front of the center release drive sled.

The trigger 16 is affixed in its proper position in the drive sled 10 by a retaining plate 30. The retaining plate 30 is secured by rivets 32 in the drive sled 10 frame. If desired by the user, a cosmetic bezel 34 (see FIG. 3) can be secured on the front side of the drive sled 10 to improve the appearance of the drive sled 10.

The trigger 16 includes a receiving slot 36 that receives the end of the connecting tab 24. The connecting tab 24 and the stop protrusion 20 are integral to the floor 22 of the drive sled 10. Accordingly, when pressure is applied to the trigger 16, trigger 16 rotates on its axle 28. As the trigger 16 rotates upward, connecting tab 24, which is secured in slot 36, is raised. Since connecting tab 24 is integral to the floor 22 of the drive sled 10, the floor 22 and integral stop protrusion 20 are also lifted. When the stop protrusion 20 clears the frame of the modular tray for computer components in which it is installed, the drive sled 10 can be easily removed.

Because of the center mount location and the stability provided by the installation method for the trigger 16, the trigger 16 becomes a convenient carrying handle for the drive sled 10.

When pressure on the trigger 16 is released, the inherent elasticity of the stop protrusion 20 causes it to return to its position below the plane of the floor 22 of the drive sled 10. To reinstall the drive sled 10, the trigger is simply squeezed again to raise the stop protrusion 20 above the plane of the floor 22, and the sled drive 10 is easily installed in the modular tray.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A drive sled for computer components comprising:

a drive sled frame with a release mechanism mounted at a longitudinal center of a front end of said drive sled; wherein said release mechanism comprises a latching means to secure said drive sled in position when said drive sled is inserted into a modular tray for computer components, said latching means comprising a securing means adapted to contact a frame of said modular tray, and said release mechanism further comprises a release trigger; and wherein said release trigger is in mechanical communication with said securing means, such that when a user actuates said release trigger, said securing means is moved from a locking position to a release position, said securing means being constructed with an inherent elasticity that causes said securing means to return to said locking position when said release trigger is returned to a starting position.

2. The drive sled of claim 1 wherein:

said securing means comprises a downward extending protrusion.

3. The drive sled of claim 2 wherein:

said downward extending protrusion is integral to a floor of said drive sled frame.

4. The drive sled of claim 1 wherein:

said latching means further comprises a connecting tab that extends upward from said floor of said drive sled frame, said connecting tab is received in a receiving slot in said trigger.

5. The drive sled of claim 1 wherein:

said release trigger is pivotally mounted at a front center position in said drive sled frame.

* * * * *